(12) United States Patent
Smith et al.

(10) Patent No.: US 10,291,489 B2
(45) Date of Patent: May 14, 2019

(54) MONITORING NETWORK PERFORMANCE

(71) Applicant: BRITISH TELECOMMUNICATIONS PUBLIC LIMITED COMPANY, London (GB)

(72) Inventors: Alan Smith, London (GB); Trevor Burbridge, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 442 days.

(21) Appl. No.: 14/780,767

(22) PCT Filed: Mar. 24, 2014

(86) PCT No.: PCT/GB2014/000109
§ 371 (c)(1),
(2) Date: Sep. 28, 2015

(87) PCT Pub. No.: WO2014/155035
PCT Pub. Date: Oct. 2, 2014

(65) Prior Publication Data
US 2016/0057028 A1 Feb. 25, 2016

(30) Foreign Application Priority Data
Mar. 28, 2013 (EP) ..................... 13250044

(51) Int. Cl.
*H04L 12/24* (2006.01)
*H04L 12/26* (2006.01)
(52) U.S. Cl.
CPC .......... *H04L 41/5067* (2013.01); *H04L 43/08* (2013.01); *H04L 43/087* (2013.01);
(Continued)

(58) Field of Classification Search
CPC ....................................................... H04L 43/08
See application file for complete search history.

(56) References Cited

U.S. PATENT DOCUMENTS 5,796,953 A * 8/1998 Zey .......................... H04L 43/50
709/227
6,993,591 B1 1/2006 Klemm
(Continued)

OTHER PUBLICATIONS

International Search Report for PCT/GB2014/000109, dated May 20, 2014, 5 pages.
(Continued)

*Primary Examiner* — Ayaz R Sheikh
*Assistant Examiner* — Debebe A Asefa
(74) *Attorney, Agent, or Firm* — Nixon & Vanderhye P.C.

(57) ABSTRACT

Methods and apparatus are disclosed for monitoring network performance in respect of a digital communications network comprising a user-network (1) having at least one user-device (11, 12, 13) therein that is able to submit requests for data to and receive data from one or more remote servers (16) via an intermediate control module (10), and an access network (5) via which data may be delivered to the user-network (1) via the control module (10). In particular, methods and apparatus are disclosed that allow a network service provider providing network services via an access network to its customers' home networks to have visibility on the performance of its customers' home networks and/or on the performance of one or more networked devices within those customers' home networks.

19 Claims, 3 Drawing Sheets

Home Network Monitoring (52) U.S. Cl.
CPC ...... *H04L 43/0829* (2013.01); *H04L 43/0864* (2013.01); *H04L 43/16* (2013.01); *H04L 43/0888* (2013.01)

(56) References Cited

U.S. PATENT DOCUMENTS

| | | | |
|---|---|---|---|
| 2001/0041566 A1* | 11/2001 | Xanthos | H04L 41/5032 |
| | | | 455/423 |
| 2002/0138443 A1* | 9/2002 | Schran | G06Q 20/382 |
| | | | 705/64 |
| 2009/0122711 A1 | 5/2009 | Soomro et al. | |
| 2009/0161554 A1 | 6/2009 | Agarwal et al. | |
| 2012/0023224 A1 | 1/2012 | Li | |
| 2012/0246515 A1* | 9/2012 | Lusenhop | G06F 11/3672 |
| | | | 714/32 |

OTHER PUBLICATIONS

Written Opinion of the ISA for PCT/GB2014/000109, dated May 20, 2014, 7 pages.
Search Report for EP 13250044, dated Aug. 14, 2013, 8 pages.
International Preliminary Report on Patentability for PCT/GB2014/000109, dated Jun. 26, 2015, 9 pages.
Fang et al., "QoS-Adaptive Proxy Caching for Multimedia Streaming Over the Internet", IEEE Transactions on Circuits and Systems for Video Technology, vol. 13, No. 3, Mar. 1, 2003, 14 pages.
Zhang et al., "Resource Allocation for Audio and Video Streaming Over the Internet", Microsoft Research, China, ISCAS 2000—IEEE International Symposium on Circuits and Systems, May 28-31, 2000, Geneva, Switzerland (4 pgs.).

* cited by examiner

Figure 1– Home Network Monitoring

Figure 2 – Flow-Chart for home gateway performance monitoring

Figure 3 – Flow-Chart for home gateway performance diagnostics

MONITORING NETWORK PERFORMANCE

This application is the U.S. national phase of International Application No. PCT/GB2014/000109 filed 24 Mar. 2014, which designated the U.S. and claims priority to EP Patent Application No. 13250044.8 filed 28 Mar. 2013, the entire contents of each of which are hereby incorporated by reference.

TECHNICAL FIELD

The present invention relates to monitoring network performance in respect of a digital communications network. Aspects and embodiments of the invention relate to methods and apparatus for monitoring network performance in respect of a digital communications network comprising a user-network having at least one user-device therein that is able to submit requests for data to and receive data from one or more remote servers via an intermediate control module, and an access network via which data may be delivered to the user-network via the control module.

In particular, preferred embodiments of the invention allow a network service provider providing network services via an access network to its customers' home networks to have visibility on the performance of its customers' home networks and/or on the performance of one or more networked devices within those customers' home networks. Such visibility may be provided without the customers or the network provider needing to install dedicated software on the customers' networked devices.

BACKGROUND TO THE INVENTION AND PRIOR ART

How customers rate the service they receive from their various internet-connected (or otherwise networked) computing and telephony devices depends to a large extent on the Quality of Experience (QoE) they perceive for internet-delivered (or, more generally, network-delivered) services. The Quality of Experience perceived will depend on the Quality of Service (QoS) that can be achieved end-to-end (e.g. from a consent origin server or a remote device to the user-device in the home). In turn the QoS achieved will depend on a number of network characteristics. Examples of network characteristics include loss, Round Trip Time, jitter and throughput. While QoE is essentially subjective, it can be inferred from a suitably-defined measure of QoS, which can be calculated from network metrics relating to suitably-chosen and measurable network performance characteristics. As will become apparent, a variety of different types of network performance characteristics or combinations thereof may be chosen and/or applicable in defining a measure of QoS. Network operators may be able to measure these in relation to data traversing paths across networks over which they have control, or between devices under their control, but they may not have sufficient control for such measurements over other networks such their customers' "home networks" or "user networks", or the devices therein.

Wireless access is becoming the predominant means for devices to communicate within home and public networks like WiFi hotspots. The inherent variability in the Quality of Service achieved by the fixed-line network termination equipment and the various wireless devices drives many complaints to network Internet Service Providers (ISPs). The QoS of the final network segment has a significant effect on the Quality of Experience. For ISPs the performance of the home network is a particular problem because it is largely invisible to it and is the ultimate cause of a large number of calls to ISP helplines. There exist various tools for end-users to test the performance of their network. There are also ways for ISPs to monitor performance to the home, such as by using Deep Packet Inspection (DPI) or by placing probes in the home, such as those in accordance with the "SamKnows" scheme, information about which is available online at www.samknows.com. The former (DPI) is computationally intensive and the latter ("SamKnows" probes) only monitor from one specific point within the home network.

Providing a means to monitor network characteristics within the home network can assist in highlighting when a customer problem is due to a home network issue and provide information to end-users to inform them of potential problems, and can also differentiate between problems in a user's home environment (or WiFi hotspot, etc.) and problems in the broadband or access network. This may be applicable in relation to the monitoring of wired as well as wireless (e.g. WiFi-connected) devices.

Some technical areas and concepts of particular relevance to the mechanism to be discussed later will now be summarised:

Quality of Experience (QoE):

A critical driver for home network monitoring solutions is QoE. The correlation between QoE scores and network characteristics has been done by asking test participants to use Internet applications (such as video streaming, web browsing, Voice over Internet Protocol (VoIP), etc.) a number of times, each time with different network characteristics. Participants are asked to rate the QoE on a scale of 1-5, for example. The results from a number of participants are combined to give an average QoE score for different inputs of network characteristics.

Content Caching:

Content (such as website data, or media content such as video content for streamed delivery, for example) may be cached somewhere closer (in network terms) to the end-user. This may be done either as a deliberate policy ("pre-caching", as is done by Content Delivery Networks (CDNs), for example) or as content is observed as it passes through a network node ("transparent caching"). The purposes of caching generally have been to reduce traffic on the core network and to improve the QoS delivered to end-users (and hence improve QoE), by reducing delay, for example.

WiFi:

One of the major causes of poor QoE in the home is the variability of WiFi in being able to deliver packets from access points to devices in a user's home network. Poor performance from WiFi-connected devices may be caused by a variety of factors, such as devices being too far from a wireless router or access point, the wireless router or access point being turned off or not working properly, the wireless router or access point itself receiving poor service from the external network, interference from other equipment within the home (not necessarily networked devices—equipment such as microwave ovens and cordless phones can cause poor performance from WiFi-connected devices), or authentication issues between networked devices and the wireless router or access point, for example.

Home Gateways/Access Points:

The home gateway performs many of the interfacing functions between the home network and an ISP's network, e.g. allocation of private IP addresses (using the Dynamic Host Configuration Protocol (DHCP)) and translation of public to private address space (Network Address Translation (NAT)). In a large number of cases the role of the home gateway is combined with that of a wireless access point. The home gateway functions could be moved to a location in the ISP's network.

WiFi networks are inherently lossier than wired networks. Packets can become corrupted as they are transmitted on the air interface. There are techniques for correcting small amounts of corruption. Typically these involve providing redundant data in the packets. Where the redundant information is insufficient to recreate the packet data, that packet is effectively lost. Such losses can be corrected by re-transmission between the WiFi device and the access point or home router. This re-transmission is performed at the layer 2 protocol in the OSI stack (i.e. in the data link layer) and is not visible within layer 3 or above (TCP/IP). Packet corruption may be caused, for example, by electro-magnetic interference within the home environment.

Corruption/Loss can affect network characteristics in many ways:

Re-transmission can increase delay (and hence increase Round Trip Time). Higher delay reduces the throughput of TCP which in turn means that the user may be able to perceive a drop in performance. TCP throughput decreases with increased Round Trip Time due to the TCP control algorithm used. The more frequently losses occur, the greater the detrimental effect is likely to be on TCP throughput, and hence on QoE.

Corruption/Loss can increase jitter. Jitter is the variability in Round Trip Time. Increasing jitter can affect some internet applications. One of the severest effects will be on live TV streaming. Jitter will be more severe where a packet has to be re-transmitted several times before it is received.

Corruption/Loss can reduce throughput. As well as the effect of delay potentially reducing TCP throughput, access point behaviour may also have an effect. As well as re-transmitting the lost packets many access points will reduce the sending rate. Essentially the higher the sending rate, the greater the probability of loss. So in a lossy environment throughput is generally reduced to compensate for this.

Loss may not be remediable. This can still happen in WiFi networks where re-transmission has not been successful. Loss can lead to poor QoE. For User Datagram Protocol (UDP) applications, loss will generally involve loss of part of the information being transmitted, e.g. loss of some part of a video frame so that increasing "blockiness" is observed by the user. In TCP applications it can lead to a reduction in throughput due to the way the TCP congestion avoidance algorithm works.

PRIOR ART TECHNIQUES

United States Patent US2009/0122711 relates to the measuring and monitoring of QoS in service-differentiated wireless networks, and in particular to methods for monitoring delay and queue length between a wireless access point and one or more wireless devices. It will be noted that it requires deployment on at least one of the wireless devices.

"Qcheck" by Ixia (see http://www.ixchariot.com/products/datasheets/qcheck.html) is a service that uses programs installed on at least one wired device and at least one wireless device for monitoring performance between the two devices.

In relation to transparent caching, an example is the "Squid" caching proxy, available for free under the GNU General Public License (http://www.squid-cache.org). This has a facility for monitoring performance via a Multi Router Traffic Grapher (MTRG) of data collected according to the Simple Network Management Protocol (SNMP). This can record the bandwidth passing through the "Squid" proxy. It will be noted that it does not map network characteristics per device or attempt to estimate the QoE for individual services for each device. It will also be noted that the Squid proxy only performs transparent caching, and does not perform pre-caching.

Various tools exist for measuring signal strength, which is generally the information most easily available to devices and access points. For determining QoE in respect of a particular application, network characteristics such as throughput, loss and delay are generally desired. One technique which can measure these is "NetSurveyor-Pro WiFi Performance Analyzer" from "Nuts About Nets". It will be noted that this must be installed on a user's device, and that it provides information on the performance of the network between that device and the access point.

"PeerApp" is an entity that provides transparent caches. As part of a suite of tools, it offers a "UBInsight" tool (http://www.peerapp.com/products/UBInsight.aspx) to monitor Key Performance Indicators on content served from the cache. This can only ever give a view down to the level of the home, and not each individual device, however.

U.S. Pat. No. 6,993,591 ("Klemm") relates to methods and apparatus for pre-fetching documents or other Internet resources in dependence on estimated round-trip times. It aims to reduce access times from the user's point of view while minimising the overhead on network, server and local resources.

A paper entitled "QoS-Adaptive Proxy Caching for Multimedia Streaming over the Internet" by Fang Yu at al relates to a quality-of-service (QoS)-adaptive proxy-caching scheme for multimedia streaming over the Internet, and describes an end-to-end caching architecture for multimedia streaming. Decisions are taken as to whether or not to cache content based on end-to-end performance, so measurements of end-to-end performance are made prior to caching.

United States patent application US2012/023224 ("Li") relates to methods and systems for measuring network round-trip delays in IP gateways.

United States patent application US2009/161554 ("Agarwal et al") relates generally to systems and methods for monitoring and diagnosing computer network problems. It uses a client-based collaborative approach for diagnosing web transaction failures. This pools together observations on the success or failure of web transactions from multiple vantage points. These observations are utilised by a collaborative "blame attribution" algorithm to identify suspect network entities that have caused web transaction failures.

Problems in the home network represent a significant proportion of calls to an ISP's help-lines, yet (generally) an ISP's customers' home networks are not only beyond the control of the ISP—they are generally not visible to the ISP, in that the ISP is not able to distinguish between different devices within home networks and monitor performance issues individually in respect thereof. Line data is available, and probes have been deployed in customer premises, but these give no indication of the actual performance delivered to customers' devices. Software can be deployed to user devices, but this requires the agreement and co-operation of the customers concerned.

Installing software on a home gateway device, which may be provided to a customer by an ISP, and which may be located within a home network or at/near the boundary thereof, or providing suitable functionality in association with home gateway functions moved inside an ISP's network, can however give a view of the QoE being experienced in respect of individual devices within a home network.

Even if software is installed on a home gateway device (or on a separate device providing home gateway functionality) by an ISP or otherwise, this does not provide any guarantee that the home gateway (or separate device) will be able to test the network performance in respect of the individual user-devices communicating with or via it. Not every device will respond to even the most minimal standard probing technique of transmitting "ping" packets to it.

The present inventors have realised that to obtain a better or more targeted view of network performance sufficient to diagnose how Internet or other networked applications are actually performing in respect of particular user-devices, a bigger or more targeted sample of data may be required. Inspection of the protocol stack such as TCP (Transmission Control Protocol) or RTP/RTCP (Real Time Protocol/Real Time Control Protocol) in respect of a particular communication event performed at an end-point in respect of that communication event can give an accurate measurement in respect of characteristics such as loss, Round Trip Time, jitter, etc. Measuring the drain rate of a data buffer can also allow calculation of the network throughput rate. In the case of communication in accordance with TCP, caching some content at a home gateway or such that it is accessible to a home gateway and can be provided therefrom allows a TCP end-point to be present on the home gateway, from where upstream and downstream network characteristics can then be measured.

SUMMARY OF THE INVENTION

According to a first aspect of the present invention, there is provided a method of monitoring network performance in respect of a digital communications network, the digital communications network comprising a user-network comprising at least one user-device operable to submit requests for data to and receive data from one or more remote servers via an intermediate control module, and an access network via which data may be delivered to the user-network via the control module; the method comprising:
  monitoring data communication between the at least one user-device and the one or more remote servers, the data communication comprising one or more requests for data submitted by the at least one user-device, and determining from the monitoring of said data communication a location in the network of at least one remote server from which at least one user device in the user-network is deemed likely to request one or more portions of data;
  identifying in dependence on the determined location in the network a remote test-server, and establishing communication between the control module and the remote test-server;
  monitoring the communication between the control module and the remote test-server and obtaining therefrom a first network performance metric in respect of the transfer of data between the control module and the remote test-server;
  in response to a request from a user-device in the user-network for a portion of data from a remote server, providing the requested portion of data from the control module to the user-device, and obtaining therefrom a second network performance metric in respect of the transfer of data between the control module and the user-device;
  establishing a network performance diagnosis in dependence on the first network performance metric and the second network performance metric.

The choice of remote server may be made in various different ways, based on various different types of criteria, and at various different stages on the overall procedure.

According to preferred embodiments, the determination of the location in the network of at least one remote server from which at least one user device in the user-network is deemed likely to request one or more portions of data may be made in dependence on the one or more requests for data submitted by the at least one user-device.

The monitored data communication may also comprise data provided by the one or more remote servers in response to one or more received requests. In such cases, the determination of the location in the network of at least one remote server from which at least one user device in the user-network is deemed likely to request one or more portions of data may be made in dependence on the data provided by the one or more remote servers in response to the one or more received requests instead of or as well as being made in dependence on the one or more requests for data submitted by the at least one user-device.

According to preferred embodiments, the step of identifying a remote test-server may comprise identifying a remote server with which the control module is able to establish communication whereby to obtain the first network performance metric.

The step of identifying a remote test-server may comprise selecting, as the remote test-server, the remote server from which at least one user device in the user-network has been deemed likely to request one or more portions of data. Alternatively, the step of identifying a remote test-server may comprise selecting, as the remote test-server, a remote server at or near the location in the network of the remote server from which at least one user device in the user-network has been deemed likely to request one or more portions of data.

The nature of the communication monitored in order to obtain the first metric may take any of various forms. It could involve the requested data itself, or a dedicated test-signal such as a "ping", for example.

According to preferred embodiments, the first network performance metric is obtained from monitoring communication between the control module and the remote test-server, said communication comprising delivery to the control module of data in response to a request submitted by the at least one user-device. Alternatively or additionally, the first network performance metric may be obtained from monitoring communication between the control module and the remote test-server, said communication comprising a response sent to the control module in response to a test signal sent to the identified remote test-server.

It will be understood that even if the server selected to be used as the remote test-server is the content server identified as the content server from which content requested by a user-device is to be obtained, rather than another content server (perhaps at a location near to the location of the actual content server identified, or one known to have similar characteristics), a dedicated test-server, or another type of server, the first network performance metric may be obtained from monitoring a response sent by the actual content server to the control module in response to a dedicated test signal, and need not be obtained from monitoring delivery to the control module of the actually-requested content.

Embodiments may use "caching" of data or portions thereof, using a technique referred to as "pre-caching", a technique referred to as "transparent caching", or otherwise, and use data that has been cached in order to assist in the determination of the first metric.

According to preferred embodiments, the method may further comprise predicting from the monitoring of data communication between the at least one user-device and the one or more remote servers one or more portions of data that at least one user device in the user-network is likely to request, obtaining the one or more predicted portions of data from the one or more remote servers, and storing the one or more obtained portions of data in a store accessible to the control module. In such embodiments, the first network performance metric may be obtained from monitoring communication between the control module and the remote test-server, said communication comprising the obtaining of said one, or more predicted portions of data from the one or more remote servers.

With embodiments such as those set out in the previous paragraph (i.e. those that use "caching"), the method may comprise ascertaining, from the monitoring of data communication between the at least one user-device and the one or more remote servers, whether a portion of data being requested by a user device in the user-network has already been obtained and is stored in a store accessible to the control module, and if so, obtaining said portion of data from said store and providing it to said user device from said control module.

A network performance diagnosis may be established in any of a variety ways, the most appropriate one of which may depend on the type of characteristic or characteristics concerned.

According to preferred embodiments, the step of establishing a network performance diagnosis may comprise one or more of the following:
  comparing the first network performance metric with the second network performance metric (which may allow disparities between performance "upstream" and "downstream" of the control module to be identified, for example);
  comparing the first network performance metric and the second network performance metric with predetermined criteria (which may allow a determination to be made as to whether an end-to-end performance issue is being caused primarily by a performance issue "upstream" of the control module or primarily by a performance issue "downstream" of the control module, for example);
  comparing disparities between the first network performance metric and the second network performance metric with predetermined criteria (which may allow a similar determination to be made);
  combining the first network performance metric with the second network performance metric whereby to obtain an end-to-end network performance metric (by adding them together, for example, or using other types of arithmetic operations in order to obtain an appropriate end-to-end network performance metric).

The first and/or second network performance metric may relate to network characteristics such as round-trip time, jitter, packet loss, throughput achieved, or others.

It should be noted that the control module may be located in the user-network, in the access network, between the user-network and the access network, or at a boundary between the user-network and the access network. It may be located in or associated with a device such as a "home gateway" device or "home-hub", which would generally be located in the user-network or at a boundary between the user-network and the access network, or it may be located in a device operable to perform some or all of the functionality of a "home gateway" device or "home-hub" device while being located in the access network or between the user-network and the access network, for example.

The location in the communications network at which the control module is located can be regarded essentially as the boundary between a path upstream thereof and a path downstream thereof. Which side should be regarded as "upstream" and which as "downstream" would depend on the direction in which data is travelling along the path through the control module, however, and even in a very simple scenario, it will be evident that data in the form of requests for content generally travel in the opposite direction to data in the form of content provided in response to those requests. Thus, while it may be appropriate to regard the respective portions of an end-to-end path either side of the control module as "upstream" and "downstream" in some contexts, such terms should not be construed in such a way as to imply that the invention only applies in respect of data travelling in a particular direction. By locating the control module between or near a boundary between networks controlled by different entities, such as a user-network and an ISP's network, however, the control module may be used to obtain respective first and second network performance metrics one of which relates to the portion of the path in the network controlled by one entity and the other of which relates to the portion of the path in the network controlled by the other.

According to a second aspect of the present invention, there is provided a control module for monitoring network performance in respect of a digital communications network, the digital communications network comprising a user-network comprising at least one user-device operable to submit requests for data to and receive data from one or more remote servers via the control module, and an access network via which data may be delivered to the user-network via the control module; the control module comprising:
  one or more probes operable to monitor data communication between the at least one user-device and the one or more remote servers, the data communication comprising one or more requests for data submitted by the at least one user-device, and to determine from the monitoring of said data communication a location in the network of at least one remote server from which at least one user device in the user-network is deemed likely to request one or more portions of data;
  a remote-test module operable to identify in dependence on the determined location in the network a remote test-server, to establish communication between the control module and the remote test-server, to monitor the communication between the control module and the remote test-server, and to obtain therefrom a first network performance metric in respect of the transfer of data between the control module and the remote test-server;
  a user-network test module operable in response to a request from a user-device in the user-network for a portion of data from a remote server to provide the requested portion of data from the control module to the user-device, and to obtain therefrom a second network performance metric in respect of the transfer of data between the control module and the user-device;

a network performance diagnosis module operable to establish, in dependence on the first network performance metric and the second network performance metric, a network performance diagnosis.

The various options and preferred embodiments referred to above in relation to the first aspect are also applicable in relation to the second aspect.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus for monitoring network performance according to a preferred embodiment will be described In particular, techniques for performing network performance monitoring of characteristics likely to affect Quality of Service (and hence Quality of Experience) in a home network will be described, Such techniques use network key performance indicators (such as bandwidth, loss, latency and jitter) which can by themselves be used to identify problems in the home network or can be combined with network characteristics between the home and various content sources in order to estimate QoE scores for a range of Internet applications such as web-browsing, video streaming, etc. The estimated QoE scores can be compared to target QoE scores to determine whether a device in the home network was capable of using a range of Internet applications with a target QoE score.

Figure 1:
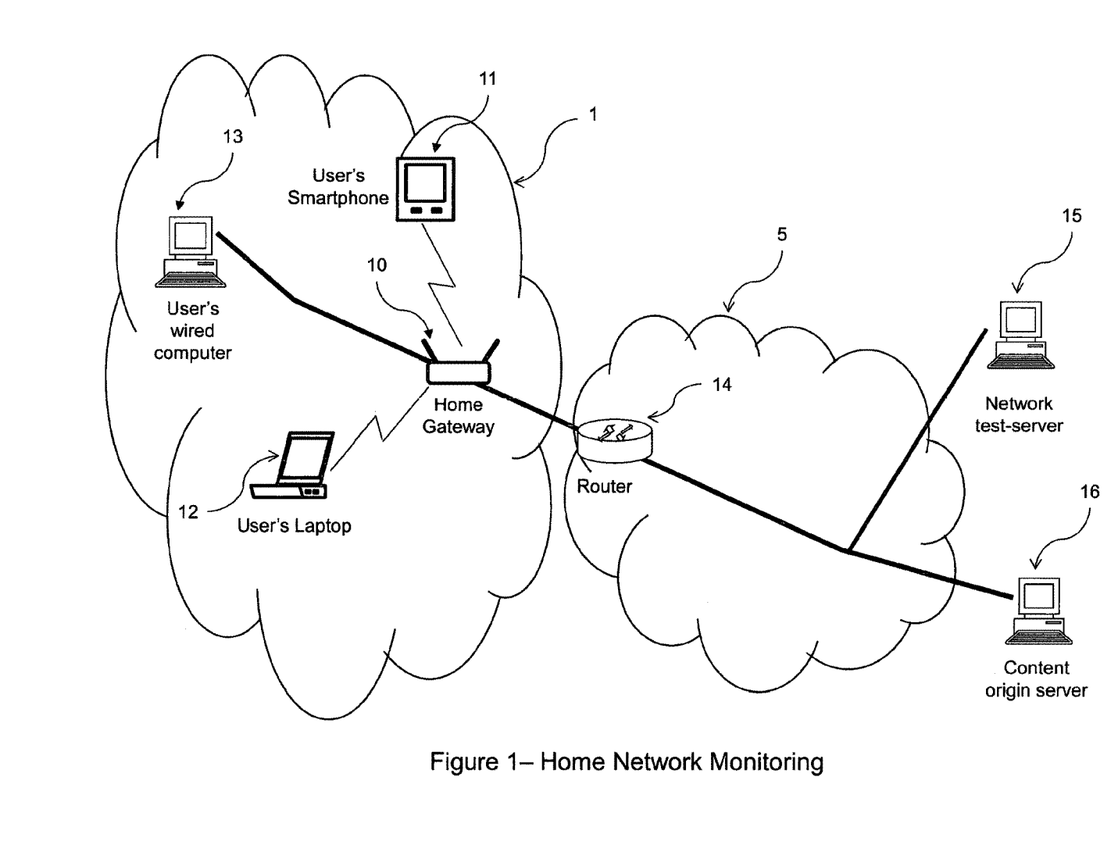
FIG. 1 shows entities that may be involved in monitoring network performance according to an embodiment of the invention.

The method is preferably implemented at the home gateway. Currently, as illustrated by FIG. 1, the functions of the home gateway generally reside in a piece of kit such as a "Home Hub" 10 that sits in the user's home and in the user's home network 1. The home gateway is normally combined with a wireless access point, which allows it to communicate wirelessly (i.e. using WiFi) with devices such as a user's (WiFi-capable) "smart-phone" 11 and/or (WiFi-capable) "lap-top" computer 12. The home gateway device 10 may also communicate wirelessly or via a wired connection with devices such as a user's "desk-top" computer 13. The functions of the home gateway may be moved to an entity such as a router 14 located in (generally at or near the edge of) the ISP's network 5. This device has been shown as a router, but this is for illustrative purposes only. It could be another type of network equipment. As will be understood, however, whether it is located in the user's home network, in the ISP's network, or at the boundary between the two, it should be located and operable such that each individual device in the user's network is identifiable therefrom.

The method according to a preferred embodiment uses content caching on the home gateway 10. This content cache is used to cache content that is believed or has been found to have, or is known to have a high probability of being downloaded by at least one device in the home, preferably more than once during a monitoring period such as a 24-hour period. The probability of repeat downloads is likely to be even greater via a public WiFi gateway. Where the home gateway functions are virtualised then the content cache can be shared between the virtualised home gateways increasing the hit-rate for cached content.

Data such as media content, or portions thereof, which may originate from a content origin server 16, and which would normally be provided directly from that content origin server 16 each time it is requested, can be pre-cached (i.e. cached in advance of the first device requesting that content), or it can be transparently cached (i.e. cached when it is observed passing through the home gateway the first (or a subsequent) time in response to a request). Pre-caching can also be done where one or more devices regularly access the same, but updated, content such as that of an on-line newspaper. Pre-caching may be important if there are devices in the user network which do not access any of the same content as other devices, or if there is a device that always accesses the content concerned first in the day (or other such monitoring period), and therefore cannot rely on it having been cached due to having been requested by another device in the network.

When a request for a piece of content is subsequently made, by smart-phone 11 or lap-top computer 12, for example, this request, which would normally pass through the home gateway 10, is intercepted by the home gateway 10 in the course of its monitoring of requests for data submitted by the devices in the home network, and the home gateway 10 may thereby ascertain that the piece of content to which the request relates is a piece of content that is already in the home gateway's cache. In view of this, the request may therefore be fulfilled from the cache, rather than from the content origin server 16. As the content is delivered, generally packet-by-packet, from the cache on the home gateway 10, the desired performance metrics are recorded. The round trip time (RTT) for each packet, the difference or variance in RTT (jitter), packet loss (i.e. any loss not compensated for by the layer 2 protocol), throughput achieved (where the content is of sufficient size that throughput ceiling is reached), or other performance metrics may be recorded. Also, information on factors such as non-completion of content delivery or repeated requests for content may be stored, as these could themselves be indicative of problems within the home network.

The presence of another device connected to the home gateway via a wired connection (such as the desk-top computer 13, but this could alternatively be a device such as a television set-top box, or a home media server, for example) would enable a larger cache to be used. Being wired the problems suffered from WiFi access are eliminated, but it may still be useful to measure the network performance characteristics between the wired device and the home gateway in order to be able to eliminate these from any calculations of the network characteristics between the home gateway and each of the other devices within the home.

The purpose of the mechanism is to calculate the end-to-end network characteristics that the end-users will be receiving. This is done by separately measuring the network characteristics:

(i) from the home gateway to and/or from the content origin server or to and/or from test servers which are in locations topologically similar to the origin server (i.e. upstream of the home gateway); and (ii) from the home gateway to and/or from the various devices in the home (i.e. downstream of the home gateway).

These two sets of data are then combined to produce end-to-end network characteristics.

How individual network characteristics are combined depends on the nature of the characteristics. The end-to-end network characteristics for every device can be input as arguments into one or more QoE functions that map network characteristics to user QoE for a number of common Internet applications. Some downstream characteristics can be useful on their own, such as the variability in round-trip time (RTT) between the home gateway and a device. High RTT variability is indicative of losses in the home WiFi network.

To perform the upstream measurement a conventional probe mechanism on the home gateway 10 can communicate with one or more content origin servers 16 (or CDN leaf nodes) to determine the network characteristics between the home gateway and those remote servers. In such cases, the content servers may serve as test-servers in respect of their own communications. If these content servers are not available for testing, however, then measurements may instead be made between the home gateway 10 and one or more dedicated test servers 15, for example. Much content will be supplied by existing CDN nodes within the Internet, some of which could be located within the ISP's network. Network test-servers can also be located at equivalent network locations.

Measuring the upstream path characteristics may be conducted periodically so that a measurement of the upstream path characteristics is taken at a similar time to that of the downstream measurement. Alternatively, measurements of the upstream path characteristics may be triggered by data actually being requested by a user device, which will allow measurements of the upstream path characteristics to be made essentially at the same time as corresponding measurements in respect of the downstream path.

Dedicated test-servers have the advantage that dedicated tests can be run to determine upstream network characteristics. Probing the content origin servers that have been used to fill the cache generally provides a more accurate view of how that service is being received by the end-user, however. Probing can be performed by periodically requesting portions of the same content that is stored in the cache.

Figure 2:
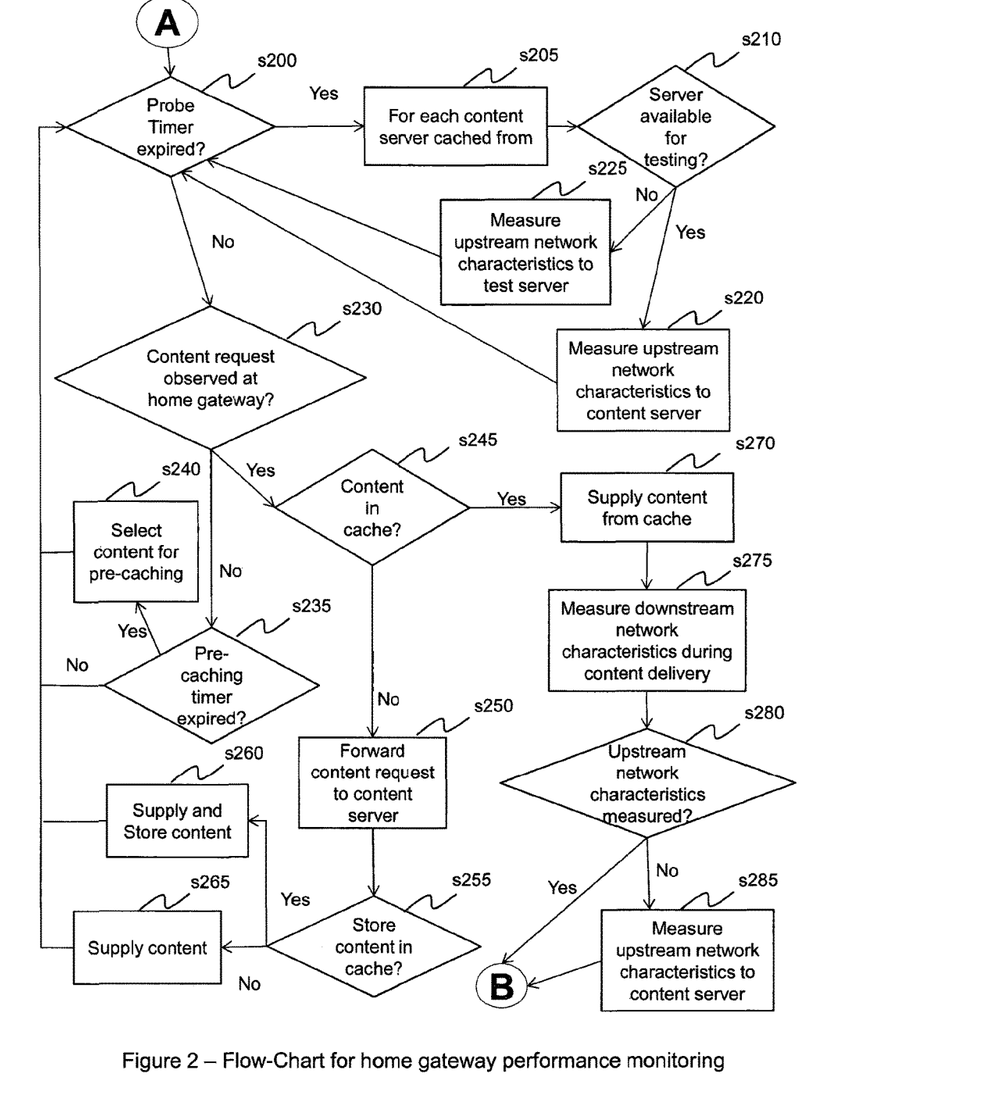
FIGS. 2 and 3 together show steps that may be performed in order to monitor network performance according to a preferred embodiment of the invention.
Figure 3:
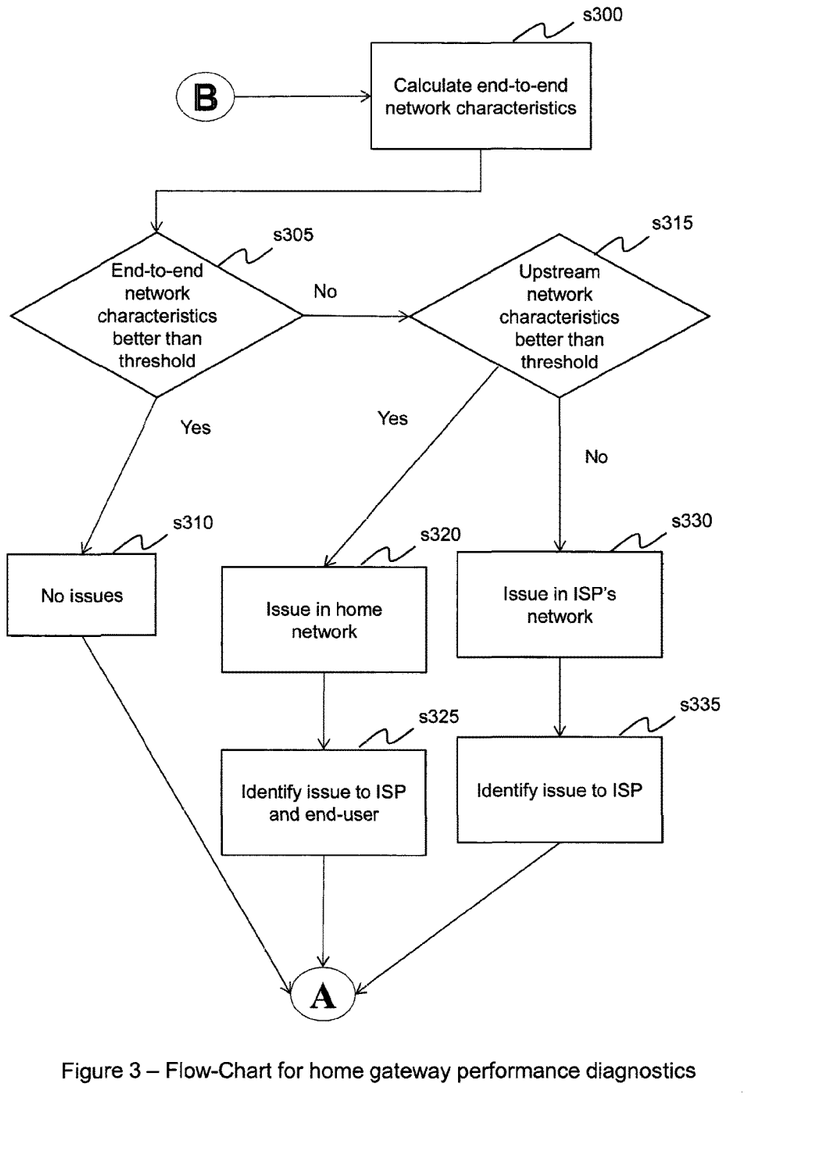

Referring now to FIGS. 2 and 3, it will be noted that these relate to different parts of one overall process, FIGS. 2 and 3 being linked to each other by nodes A and B. For convenience, the overall process has been divided into two parts, with FIG. 2 showing those steps principally concerned with the monitoring, by the home gateway, of data communication and with the obtaining, by the home gateway, of network performance characteristics, and FIG. 3 showing those steps principally concerned with the establishment of a network performance diagnosis using network performance characteristics obtained by the home gateway.

Referring to FIG. 2 in more detail, this shows steps by virtue of which a probing mechanism may measure upstream network characteristics, store content in a cache and measure downstream network characteristics when cached content is requested by a user device. Periodically (s200) the home gateway connects to one or more content servers from which the local cache on the home gateway has previously cached content (s205) and measures the upstream network characteristics to and from that server (s220), e.g. by requesting again a portion of the content already in the cache. It will be appreciated that measuring upstream performance in respect of the "upstream" path between the home gateway and the original content server provides more precise measurements of upstream network characteristics for the Internet applications that the user generally uses or is actually using rather than measuring a set of generic network characteristics, as is done in most existing probing techniques.

If the content server is not available (s210) or there is not yet any content in the cache then the home gateway can connect to one or more test servers which stand as proxies for the content servers and the upstream network characteristics to and from those test servers are measured (s225).

The home gateway will monitor for content requests from user devices (s230). When no requests are being received the home gateway will periodically (s235) seek to fill the local cache with more or alternative content (s240). Many caching techniques are well known. For this particular method, content is chosen such that there is always content available for each device that uses the home gateway.

If a content request is observed (s230) then the cache is checked to see if that content is contained within it (s245). If it is not, the content request is forwarded to the content server (s250). A decision is made as to whether that content should be stored in the local cache (s255) when it is subsequently observed passing through the home gateway. If it is to be cached then the content passes through the home gateway on its way to the user device (260) and is transparently cached as it does so. If not then the content passes through the home gateway to the user device without any intervention (s265).

If the content is in the cache (result from s245) then that content is supplied from the cache (s270) and downstream measurements of network characteristics can be made during delivery (s275).

Supplying content from the cache allows measurements without requiring any additional software to be available on each device within the home. Measurements can be taken, for example, from the TCP stack, so, for example, loss of a packet can be determined from TCP sequence number inspection. Round Trip Time can be measured between a packet being transmitted and its acknowledgement ("ack") coming back. Compensation may be made for delayed "acks" (acknowledging every $n^{th}$ packet rather than every packet). Jitter can be calculated from the variation in Round Trip Time for each packet separately acknowledged.

In order to ensure that they are available for use in subsequent calculations, a check may be made that the upstream network characteristics have previously been measured (s280). If not then they are measured now (s285). A portion of the content supplied from the cache can be requested again and upstream network characteristics measured. In this way a measurement of the end-to-end network characteristics can be made as if the user device had been supplied with that content at that time from the actual content origin server.

Interpretation of Results

FIG. 3 shows how the results of recording network statistics can be used to analyse how the home network is performing. The end-to-end network characteristics are calculated (s300) by combining the upstream and downstream network characteristics. How network characteristics are combined depends on the individual characteristic. For example, the end-to-end throughput to a device is the minimum of the downstream and upstream throughputs. End-to-end round trip time (RTT) is the addition of the upstream and downstream RTTs. End-to-end loss (similarly) is the addition of the upstream and downstream loss.

If the end-to-end network characteristics are better than a threshold (s305) then there are no issues with the end-to-end performance between the content server and the device. What the threshold is will be dependent on the particular Internet application. If the end-to-end network characteristics are worse than the threshold (result from s305) then the upstream network characteristics are compared with the threshold (s315). This is an indication of whether the content would have been adequately received if it had been consumed by a device co-located with the home gateway. If the upstream network characteristics (result from s315) are better than the threshold then it can be concluded that there is an issue in the home network (s320). The issue is identified to the ISP and potentially to the user, for example via a graphic user interface (GUI) on the home gateway (s325). If the upstream network characteristics are worse than the threshold (result from s315) then it can be concluded that there is an issue in the ISP network (s330) or interconnection to content provider network. The issue is identified to the ISP (s335).

What is claimed is:

1. A method comprising:
    monitoring network performance in respect of a digital communications network, the digital communications network comprising a user-network comprising at least one user-device operable to submit requests for data to and receive data from one or more remote servers via an intermediate control module, and an access network via which data may be delivered to the user-network via the control module;
    the monitoring of the network performance being performed by the control module and including steps of:
        monitoring data communication between the at least one user-device and the one or more remote servers, the data communication comprising one or more requests for data submitted by the at least one user-device, and determining from the monitoring of said data communication a location in the network of at least one remote server from which at least one user device in the user-network is deemed likely to request one or more portions of data;
        identifying in dependence on the determined location in the network a remote test-server, and establishing communication between the control module and the remote test-server;
        monitoring the communication between the control module and the remote test-server and obtaining therefrom a first network performance metric in respect of the transfer of data between the control module and the remote test-server; and
        in response to a request from a user-device in the user-network for a portion of data from a remote server, providing the requested portion of data from the control module to the user-device;
    wherein the method further comprises obtaining from the provision of the requested portion of data from the control module to the user-device a second network performance metric in respect of the transfer of data between the control module and the user-device; and
    establishing a network performance diagnosis in dependence on the first network performance metric and the second network performance metric.

2. A method according to claim 1 wherein the determination of the location in the network of at least one remote server from which at least one user device in the user-network is deemed likely to request one or more portions of data is made in dependence on the one or more requests for data submitted by the at least one user-device.

3. A method according to claim 1 wherein the monitored data communication comprises data provided by the one or more remote servers in response to one or more received requests.

4. A method according to claim 3 wherein the determination of the location in the network of at least one remote server from which at least one user device in the user-network is deemed likely to request one or more portions of data is made in dependence on the data provided by the one or more remote servers in response to the one or more received requests.

5. A method according to claim 1 wherein the step of identifying a remote test-server comprises identifying a remote server with which the control module is able to establish communication whereby to obtain the first network performance metric.

6. A method according to claim 5 wherein the step of identifying a remote test-server comprises selecting, as the remote test-server, the remote server from which at least one user device in the user-network has been deemed likely to request one or more portions of data.

7. A method according to claim 5 wherein the step of identifying a remote test-server comprises selecting, as the remote test-server, a remote server at or near the location in the network of the remote server from which at least one user device in the user-network has been deemed likely to request one or more portions of data.

8. A method according to claim 1 wherein the first network performance metric is obtained from monitoring communication between the control module and the remote test-server, said communication comprising delivery to the control module of data in response to a request submitted by the at least one user-device.

9. A method according to claim 1 wherein the first network performance metric is obtained from monitoring communication between the control module and the remote test-server, said communication comprising a response sent to the control module in response to a test signal sent to the identified remote test-server.

10. A method according to claim 1, the method further comprising predicting from the monitoring of data communication between the at least one user-device and the one or more remote servers one or more portions of data that at least one user device in the user-network is likely to request, obtaining the one or more predicted portions of data from the one or more remote servers, and storing the one or more obtained portions of data in a store accessible to the control module.

11. A method according to claim 10 wherein the first network performance metric is obtained from monitoring communication between the control module and the remote test-server, said communication comprising the obtaining of said one or more predicted portions of data from the one or more remote servers.

12. A method according to claim 10, the method comprising ascertaining, from the monitoring of data communication between the at least one user-device and the one or more remote servers, whether a portion of data being requested by a user device in the user-network has already been obtained and is stored in a store accessible to the control module, and if so, obtaining said portion of data from said store and providing it to said user device from said control module.

13. A method according to claim 1, wherein the step of establishing a network performance diagnosis comprises one or more of:

comparing the first network performance metric with the second network performance metric;
comparing the first network performance metric and the second network performance metric with predetermined criteria;
comparing disparities between the first network performance metric and the second network performance metric with predetermined criteria;
combining the first network performance metric with the second network performance metric whereby to obtain an end-to-end network performance metric.

14. A method according to claim 1, wherein the first and/or second network performance metrics relate to network characteristics indicative of one or more of round-trip time, jitter, packet loss, and throughput achieved.

15. A system comprising:
storage memory storing computer readable code;
a computer hardware processor for executing the code to implement a control module for monitoring network performance in respect of a digital communications network, the digital communications network comprising a user-network comprising at least one user-device operable to submit requests for data to and receive data from one or more remote servers via the control module, and an access network via which data may be delivered to the user-network via the control module;
the control module comprising:
one or more probes operable to monitor data communication between the at least one user-device and the one or more remote servers, the data communication comprising one or more requests for data submitted by the at least one user-device, and to determine from the monitoring of said data communication a location in the network of at least one remote server from which at least one user device in the user-network is deemed likely to request one or more portions of data;
a remote-test module operable to identify in dependence on the determined location in the network a remote test-server, to establish communication between the control module and the remote test-server, to monitor the communication between the control module and the remote test-server, and to obtain therefrom a first network performance metric in respect of the transfer of data between the control module and the remote test-server; and
a user-network test module operable in response to a request from a user-device in the user-network for a portion of data from a remote server to provide the requested portion of data from the control module to the user-device;
wherein the user-network test module is further operable to obtain from the provision of the requested portion of data from the control module to the user-device a second network performance metric in respect of the transfer of data between the control module and the user-device; and
wherein the control module further comprises a network performance diagnosis module operable to establish, in dependence on the first network performance metric and the second network performance metric, a network performance diagnosis.

16. A method according to claim 1, wherein:
the control module is located in a gateway device which is located between the at least one user-device of the user network and the one or more remote servers and which communicates wirelessly with the at least one user-device of the user network.

17. The system according to claim 15, wherein:
the computer hardware processor for executing the code to implement the control module is located in a gateway device which is located between the at least one user-device of the user network and the one or more remote servers and which communicates wirelessly with the at least one user-device of the user network.

18. A method according to claim 1, wherein:
the control module is located in a router which is located in the access network and between the at least one user-device of the user network and the one or more remote servers.

19. The system according to claim 15, wherein:
the computer hardware processor for executing the code to implement the control module is located in a router which is located in the access network and between the at least one user-device of the user network and the one or more remote servers.

* * * * *